US012646205B2

(12) United States Patent
Tian et al.

(10) Patent No.: US 12,646,205 B2
(45) Date of Patent: Jun. 2, 2026

(54) HIERARCHICAL SEGMENT-BASED MAP OPTIMIZATION FOR LOCALIZATION AND MAPPING SYSTEM

(71) Applicant: Intel Corporation, Santa Clara, CA (US)

(72) Inventors: Yuxin Tian, Beijing (CN); Xuesong Shi, Beijing (CN); Peng Wang, Beijing (CN); Yujie Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 18/568,676

(22) PCT Filed: Aug. 31, 2021

(86) PCT No.: PCT/CN2021/115828
§ 371 (c)(1),
(2) Date: Dec. 8, 2023

(87) PCT Pub. No.: WO2023/028892
PCT Pub. Date: Mar. 9, 2023

(65) Prior Publication Data
US 2024/0212204 A1 Jun. 27, 2024

(51) Int. Cl.
*G06T 7/73* (2017.01)
*G06T 7/11* (2017.01)

(52) U.S. Cl.
CPC ................. *G06T 7/73* (2017.01); *G06T 7/11* (2017.01); *G06T 2207/20021* (2013.01); *G06T 2207/20072* (2013.01)

(58) Field of Classification Search
CPC ... G06T 7/73; G06T 7/11; G06T 2207/20021; G06T 2207/20072; G06T 2207/10016;
(Continued)

(56) References Cited

U.S. PATENT DOCUMENTS

2020/0088520 A1* 3/2020 Lin ...................... G05D 1/0274
2020/0341150 A1 10/2020 Ma et al.
(Continued)

FOREIGN PATENT DOCUMENTS

CN 108235725 A 6/2018
CN 108332759 A 7/2018
(Continued)

OTHER PUBLICATIONS

International Searching Authority, "International Search Report and Written Opinion," issued in connection with International Application No. PCT/CN2021/115828, May 26, 2022, 7 pages.
(Continued)

*Primary Examiner* — Jonathan A Boyd
(74) *Attorney, Agent, or Firm* — Hanley, Flight & Zimmerman, LLC

(57) ABSTRACT

The disclosure provides techniques for map optimization for a localization and mapping system. The map optimization method includes segmenting, based on a preset segmentation condition, a trajectory tracked by the localization and mapping system to obtain a plurality of segments of the trajectory, each segment being partitioned into a head part, an interior part and a tail part; performing a global optimization process based on frames in the head and tail parts of each segment to obtain optimized mapping results for the frames in the head and tail parts of the segment; estimating optimized mapping results for frames in the interior part of each segment based on the optimized mapping results for the frames in the head and tail parts of the segment; and updating a map built by the localization and mapping system according to the optimized mapping results for the frames in each segment.

20 Claims, 8 Drawing Sheets

700

Segment, based on a preset segmentation condition, a trajectory tracked by the localization and mapping system to obtain a plurality of segments of the trajectory, each of the plurality of segments being partitioned into a head part, an interior part and a tail part — 710

Perform a global optimization process based on frames in the head part and the tail part of each segment of the trajectory to obtain optimized mapping results for the frames in the head part and the tail part of each segment of the trajectory — 720

Estimate optimized mapping results for frames in the interior part of each segment of the trajectory based on the optimized mapping results for the frames in the head part and the tail part of the segment — 730

Update a map built by the localization and mapping system according to the optimized mapping results for the frames in each segment of the trajectory — 740

(58) Field of Classification Search
CPC .......... G06T 2207/30241; G06T 7/579; G06V 20/56
See application file for complete search history.

(56) References Cited

U.S. PATENT DOCUMENTS

| | | | | |
|---|---|---|---|---|
| 2020/0364901 A1* | 11/2020 | Choudhuri | .............. | G06F 3/005 |
| 2021/0272313 A1* | 9/2021 | Wang | ...................... | G06F 18/22 |
| 2021/0405200 A1* | 12/2021 | Ding | ........................ | G06T 17/05 |

FOREIGN PATENT DOCUMENTS

| | | |
|---|---|---|
| CN | 111292420 A | 6/2020 |
| WO | 2020113425 A1 | 6/2020 |

OTHER PUBLICATIONS

Zhang et al., "Efficient Non-Consecutive Feature Tracking for Robust Structure-From-Motion," IEEE, IEEE Transactions on Image Processing, vol. 25, No. 12, Dec. 2016, 14 pages.

Zhou et al., "Stochastic Bundle Adjustment for Efficient and Scalable 3D Reconstruction," European Conference on Computer Vision, 2020, 16 pages.
Li et al., "Hybrid Camera Pose Estimation with Online Partitioning for SLAM," arXiv:1908.01797v2 [cs.CV], [https://doi.org/10.48550/arXiv.1908.01797], Nov. 2, 2020, 8 pages.
Jang et al., "Pose Correction Algorithm for Relative Frames between Keyframes in SLAM," arXiv:2009.08724v1 [cs.RO], [https://doi.org/10.48550/arXiv.2009.08724], Sep. 18, 2020, 15 pages.
Kaess et al., "iSAM: Incremental Smoothing and Mapping," IEEE, IEEE Transactions on Robotics, Manuscript, Sep. 7, 2008, 14 pages.
Liu et al., "ICE-BA: Incremental, Consistent and Efficient Bundle Adjustment for Visual-Inertial Slam," IEEE Xplore, IEEE Conference on Computer Vision and Pattern Recognition, 2018, 9 pages.
Ila et al., "Fast Incremental Bundle Adjustment with Covariance Recovery," IEEE, 2017 International Conference on 3D Vision (3DV), 2017, 10 pages.
Sumikura et al., "OpenVSLAM: A Versatile Visual SLAM Framework," arXiv:1910.01122v3 [cs.CV], [https://doi.org/10.48550/arXiv.1910.01122], Apr. 6, 2023, 6 pages.
Mur-Artal et al., "ORB-SLAM2: an Open-Source SLAM System for Monocular, Stereo and RGB-D Cameras," arXiv:1610.06475v2 [cs.RO], [https://doi.org/10.48550/arXiv.1610.06475], 9 pages.

* cited by examiner

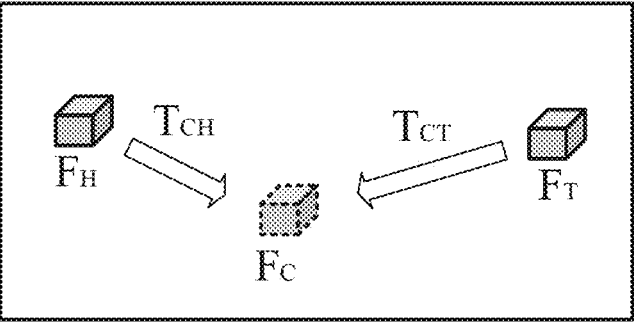
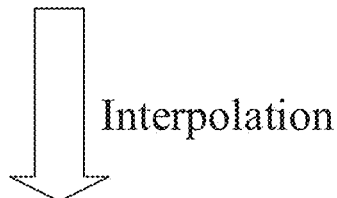
Interpolation
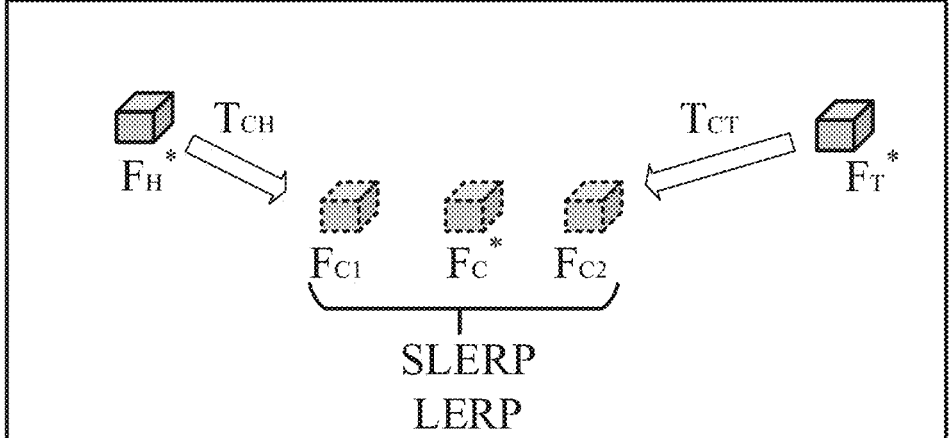
FIG. 6

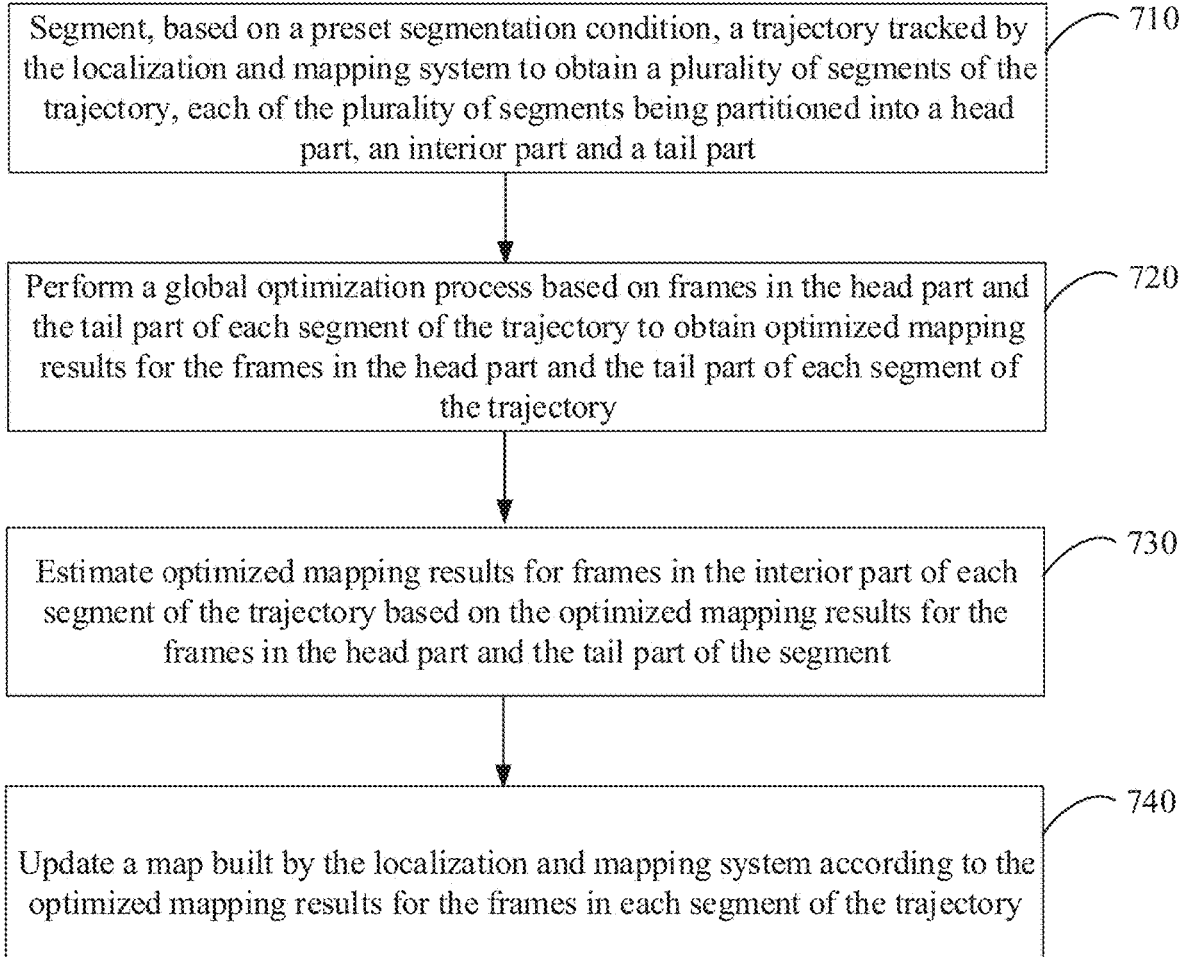

700

Segment, based on a preset segmentation condition, a trajectory tracked by the localization and mapping system to obtain a plurality of segments of the trajectory, each of the plurality of segments being partitioned into a head part, an interior part and a tail part    710

Perform a global optimization process based on frames in the head part and the tail part of each segment of the trajectory to obtain optimized mapping results for the frames in the head part and the tail part of each segment of the trajectory    720

Estimate optimized mapping results for frames in the interior part of each segment of the trajectory based on the optimized mapping results for the frames in the head part and the tail part of the segment    730

Update a map built by the localization and mapping system according to the optimized mapping results for the frames in each segment of the trajectory    740

FIG. 7

HIERARCHICAL SEGMENT-BASED MAP OPTIMIZATION FOR LOCALIZATION AND MAPPING SYSTEM

CROSS-REFERENCE TO RELATED APPLICATION

This Patent arises from a US National Stage of International Application No. PCT/CN2021/115828, filed Aug. 31, 2021, and entitled "HIERARCHICAL SEGMENT-BASED MAP OPTIMIZATION FOR LOCALIZATION AND MAPPING SYSTEM". Priority to International Application No. PCT/CN2021/115828 is hereby claimed. International Application No. PCT/CN2021/115828 is hereby incorporated by reference in its entirety.

TECHNICAL FIELD

Embodiments described herein generally relate to localization and mapping, and more particularly relate to hierarchical segment-based map optimization for a localization and mapping system.

BACKGROUND

With widespread use of various cameras and development of three-dimensional (3D) computer vision, the localization and mapping system, such as a Simultaneous Localization and Mapping (SLAM) system and a structure-from-motion (SfM) system, has been extensively studied in the past few decades. In order to improve the accuracy of mapping and localization, it is an indispensable part to optimize 3D pose information using a back-end map optimization algorithm. However, computation cost of map optimization increases sharply with cumulative trajectory length. So it is a major challenge for scaling the SLAM or SfM system to large-area, long-term or multi-agent scenarios.

BRIEF DESCRIPTION OF THE DRAWINGS

The various advantages of the embodiments will become apparent to one skilled in the art by reading the following specification and appended claims, and by referencing the following drawings, in which:

FIG. 6 shows an example interpolation process for estimating optimized mapping results of frames in an interior part of a segment of a trajectory tracked by the localization and mapping system, according to some embodiments of the present disclosure;

FIG. 7 shows an example flow chart of a map optimization method for the localization and mapping system, according to some embodiments of the present disclosure.

DETAILED DESCRIPTION

Figure 1:
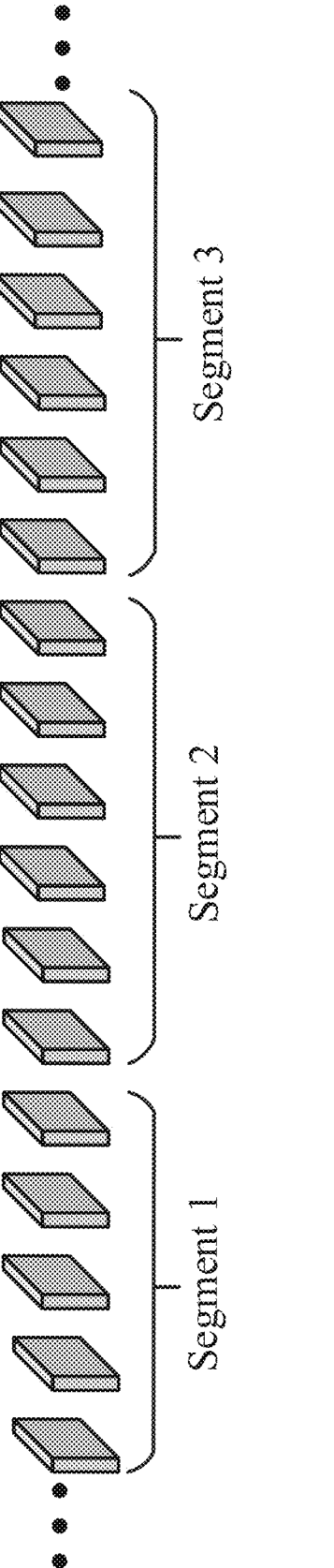
FIG. 1 shows an example of segmentation without a buffer area for a trajectory tracked by the localization and mapping system, according to some embodiments of the present disclosure.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The localization and mapping system, such as a SLAM system and a SfM system, has been extensively studied in the past few decades. The SLAM system aims at estimating 6 Degree of Freedom (6DoF) camera poses for a continuous trajectory in real-time, and is a commonly used localization and mapping system for real-time state estimation for autonomous systems, such as robots, drones and autonomous vehicles. Most modern SLAM systems have a back-end of graph optimization for pose refinement, global consistency and map fusion, so the SLAM system may be commonly divided into two parts, front-end tracking for rough estimation and back-end optimization for accurate estimation. The SfM system is similar to the SLAM system in the concept of pose estimation, but the SfM system focuses on offline reconstruction for unordered image sequences.

Both SLAM and SfM systems require a back-end global optimization process to improve estimation accuracy by distributing errors globally. Bundle adjustment (BA) is such an optimization method often used in the SLAM and SfM systems. Meanwhile, pose graph optimization is another optimization method that is commonly used in the SLAM system. Unlike the BA that optimizes both poses and landmarks (a landmark represents a 3D position of a feature point in the world coordinate), the pose graph optimization only optimizes poses. Besides, the BA considers a reprojection error as an optimization target, while the pose graph optimization considers a relative pose error as the optimization target.

However, the traditional BA and pose graph optimizations require excessive computation and usually a large number of iterations, which consumes a lot of computation resources and time. As a result, many real-time, large-scale, and complex multi-robot applications are hindered. It is a major challenge for scaling the SLAM or SfM system to large-area, long-term or multi-agent scenarios. Currently, various methods have been proposed to accelerate map optimization, but these methods fail to strike a balance between accuracy and efficiency.

Existing methods to speed up map optimization may be categorized into two types: incremental optimization and hierarchical optimization. For the incremental optimization, new frames are incrementally merged into an existing map to avoid updating the entire map. For the hierarchical optimization, the optimization is divided into several phases and in each phase only a sub-group of nodes are optimized. For example, a trajectory tracked by the SLAM or SfM system may be partitioned into several segments with a small error within each segment and large errors between segments, and the optimization may start by solving easy-to-converge sub-problems and later merging the segments.

These existing map optimization methods are mainly designed for the SfM system, which solve the off-line 3D reconstruction issue using unordered images. Also, the existing map optimization methods have some drawbacks. For example, with some incremental BA optimization methods, the performance of the SfM system may suffer from poor initialization and accumulated error, especially for long sequences; and with some hierarchical BA optimization methods, the SfM system may be not able to strike a balance between efficiency and accuracy. For example, some hierarchical BA optimization methods change the way of partitioning in an adaptive way between iterations during optimization, which introduces extra complexity cost, and some hierarchical BA optimization methods merge segments by calculating pairwise transformations, which is easy to cause accumulated error, thus the efficiency is improved at the cost of a large sacrifice of accuracy.

In view of these issues, a hierarchical segment-based map optimization method is proposed following the line of hierarchical optimization in the present application. Unlike traditional optimization methods that mainly focus on the SfM system, the proposed method makes full use of the orderly and rich prior knowledge of the SLAM system to improve the efficiency of optimization algorithm. The pose transformation velocity information and the reprojection error information generated during tracking in the SLAM system may be used for segmentation. The proposed method tries to provide a more accurate result for poses corresponding to frames within the segment and a less ideal result for poses corresponding to frames between segments. In this way, when global optimization is performed, more attention will be paid to areas with poor accuracy, so that better optimization results can be obtained while improving efficiency.

According to some embodiments of the present disclosure, the hierarchical segment-based map optimization method may be divided into three phases including Phase 1—Segmentation, Phase 2—Optimization, and Phase 3—Map update. These phases will be described in detail below with reference to accompanying figures.

Phase 1—Segmentation

To improve the efficiency of the localization and mapping system, the global optimization should mainly optimize the parts with lower accuracy and pay less attention to the parts with better accuracy. Therefore, the ideal frame segmentation should follow the principles: for each segment, the pose estimations of the frames and the landmarks within a segment are relatively accurate; and the pose estimations at connection parts between segments have a relatively large error.

To this end, it is proposed to use a pose transformation velocity and a reprojection error of each frame as the criterion for segmentation. Equation (1) shows a mathematical form of a preset segmentation condition:

$$\begin{cases} \left\| \vec{v}(F_C) - \frac{1}{|\phi|}\sum_{F_i \in \varphi} \vec{v}(F_i) \right\| & < \sigma_v \\ reproj(F_C) & < \sigma_r \end{cases} \tag{1}$$

where $$reproj(F_C) = \frac{1}{|\delta(F_C)|} \sum_{L_j \in \delta(F_C)} \|u_j - \pi(L_j, F_C)\|$$

where $F_C$ represents a current frame in a trajectory tracked by the localization and mapping system, $\varphi$ represents a set of all frames in a segment preceding the current frame, $|\varphi|$ represents a number of the frames in the segment preceding the current frame, $F_i$ represents an ith frame in the segment preceding the current frame, $$\vec{v}(F_i)$$

represents a pose transformation velocity vector of the ith frame in the segment preceding the current frame, $$\vec{v}(F_C)$$

represents a pose transformation velocity vector of the current frame, $reproj(F_C)$ represents a reprojection error of the current frame, $\delta(F_C)$ represents a set of landmarks observable in the current frame, $|\delta(F_C)|$ represents a number of the landmarks observable in the current frame, $L_j$ represents a jth landmark observable in the current frame, $u_j$ represents an observed position of the jth landmark in the current frame, $\pi(L_j, F_C)$ represents a calculated projection position of the jth landmark in the current frame, $\sigma_v$ and $\sigma_r$ are threshold parameters for the pose transformation velocity and the reprojection error of the current frame respectively.

When the preset segmentation condition as defined by Equation (1) is satisfied (i.e. both inequalities in Equation (1) are true), the current frame may be categorized as a part of the segment preceding the current frame, that is, the segment preceding the current frame may be extended to include the current frame. Otherwise, when any inequality in Equation (1) is not true, the segment preceding the current frame ends and a new segment may be created by including the current frame as a first frame of the new segment.

FIG. 1 shows an example of segmentation without a buffer area for a trajectory tracked by the localization and mapping system, according to some embodiments of the present disclosure. The segmentation may be performed based on the preset segmentation condition as defined by Equation (1). As show in FIG. 1, two adjacent segments are directly connected. In this case, a specific location of a splitting point between two adjacent segments needs to be handled carefully when segmenting, because different segmentations may yield different outputs, which may affect the robustness of the optimization.

Figure 2:
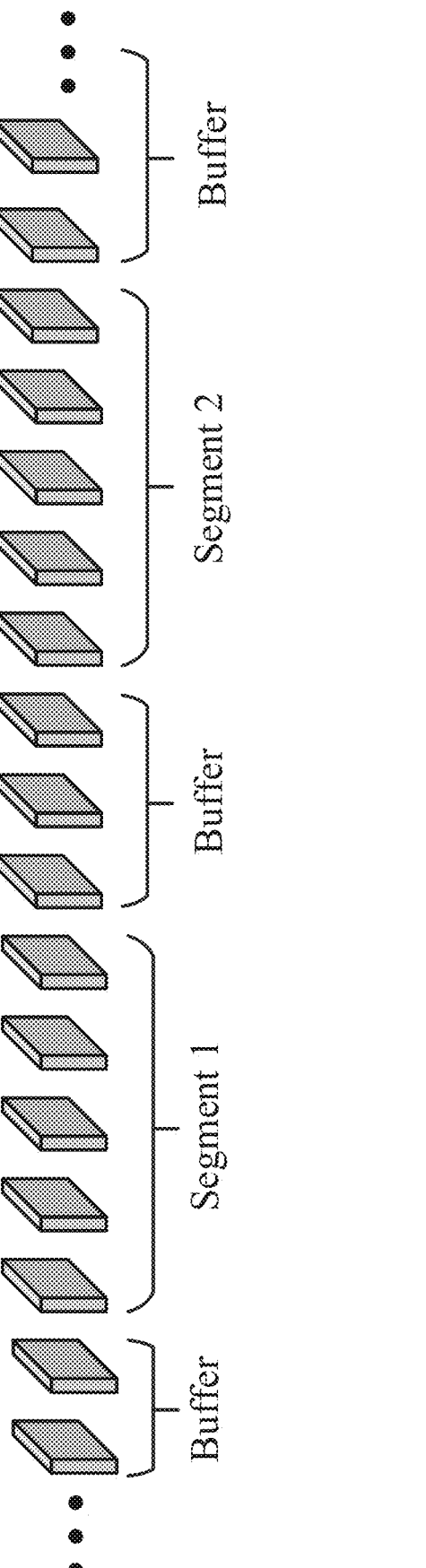
FIG. 2 shows an example of segmentation with buffer areas for a trajectory tracked by the localization and mapping system, according to some embodiments of the present disclosure.
Figure 3:
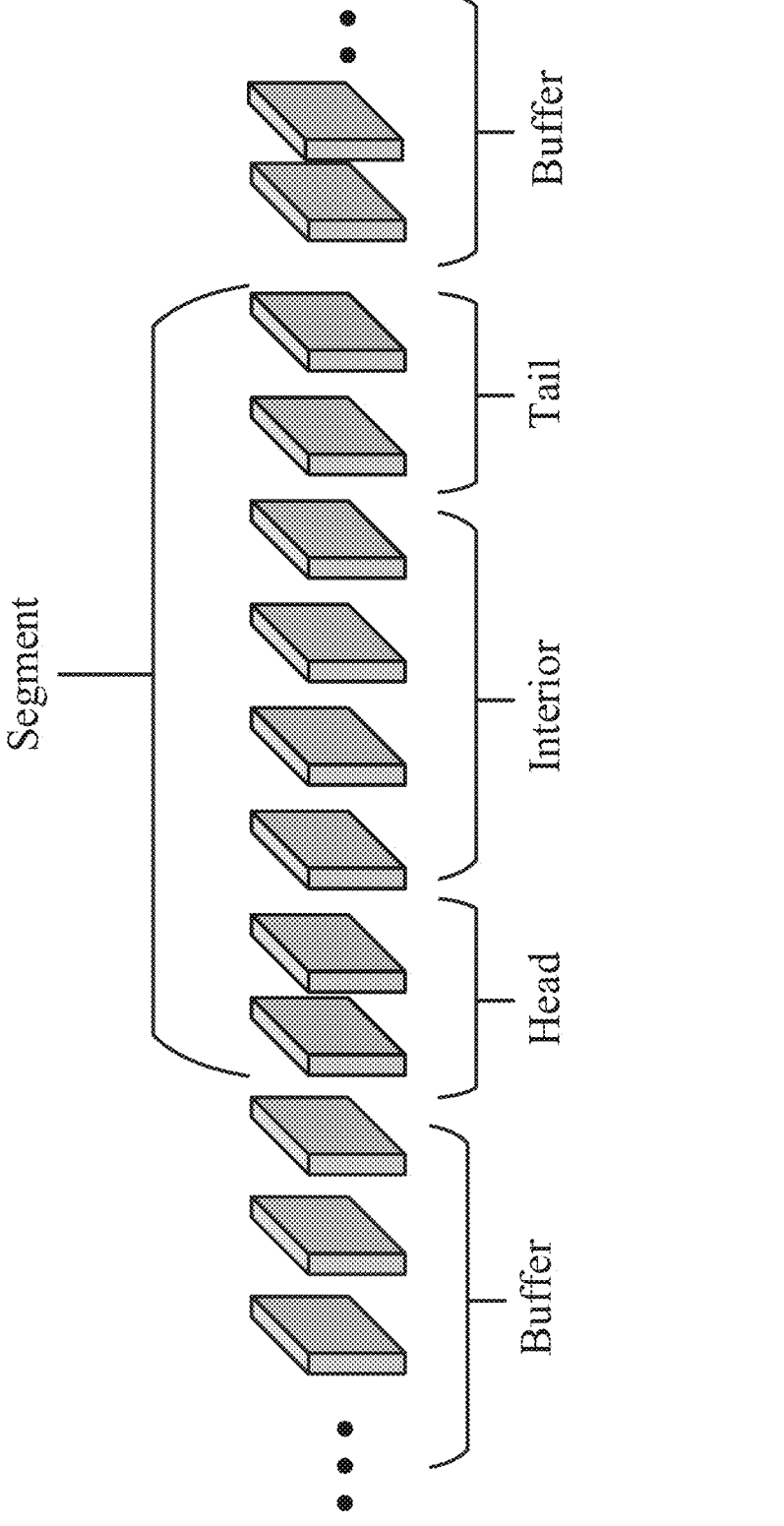
FIG. 3 shows an example of segmentation with buffer areas and further partitions within each segment for a trajectory tracked by the localization and mapping system, according to some embodiments of the present disclosure.

According to some embodiments of the present disclosure, a buffer mechanism may be designed to improve the robustness of segmentation by avoiding excessively high requirements for segmentation accuracy. Specifically, between the divided two segments, a buffer area may be placed. FIG. 2 shows an example of segmentation with buffer areas for a trajectory tracked by the localization and mapping system, according to some embodiments of the present disclosure.

In the process of segmentation, the segmentation condition defined in Equation (1) may be firstly used to determine whether a current segment is going to end, then some frames may be placed into the buffer area until both the velocity change and the reprojection error have recovered to a relatively stable level, and finally a new segment may be created and the above process may be repeated. The preset buffer condition is given by Equation (2):

$$\eta(F_C) = \alpha \times \eta_v(F_C) + \beta \times \eta_r(F_C) \geq \sigma_\eta \qquad (2)$$

where $$\eta_v(F_C) = \frac{\left\| \vec{v}(F_C) - \frac{1}{|\varphi|} \sum_{F_i \in \varphi} \vec{v}(F_i) \right\|}{\left\| \frac{1}{|\varphi|} \sum_{F_i \in \varphi} \vec{v}(F_i) \right\|},$$

$$\eta_r(F_C) = \frac{\left| reproj(F_C) - \frac{1}{|\varphi|} \sum_{F_i \in \varphi} |reproj(F_i)| \right|}{\left| \frac{1}{|\varphi|} \sum_{F_i \in \varphi} |reproj(F_i)| \right|}$$

where $\eta_v(F_C)$ represents a stability of the pose transformation velocity of the current frame, $\eta_r(F_C)$ represents a stability of the reprojection error of the current frame, $\alpha$ and $\beta$ are weight factors, $\eta(F_C)$ represents a weighted stability of the pose transformation velocity and the reprojection error of the current frame, and a represents a threshold parameter for the weighted stability. In addition, it is noted that the same parameters in Equation (2) as those in Equation (1) have the same meaning.

According to some embodiments of the present disclosure, when the preset segmentation condition is not satisfied but the preset buffer condition is satisfied, the current frame may be categorized as a frame of the buffer area, and when neither the preset segmentation condition nor the preset buffer condition is satisfied, the current frame may be categorized as a frame of the new segment. For example, the weight factor $\alpha$ may be set as 0.2, the weight factor $\beta$ may be set as 0.8, and the threshold parameter $\sigma_\eta$ may be set as 0.5. In this case, when the weighted stability $\eta(F_C)$ of the current frame is greater than or equal to 0.5, the current frame may be placed in the buffer area; when the weighted stability $\eta(F_C)$ of the current frame is less than 0.5, the buffer area may end and a new segment may be created.

It can be understood that the buffer mechanism may effectively alleviate the excessive requirements of segmentation accuracy in traditional segmentation methods, and improve the robustness of the optimization. The design of buffer mechanism can also flexibly handle continuous inaccurate pose estimations. At the same time, the use of the buffer area hardly produces extra computational cost for the system. Compared with traditional segmentation methods, the segmentation with buffer areas sacrifices very little efficiency in exchange for the improvement of robustness and accuracy.

In addition, in order to facilitate subsequent optimization, each segment may be partitioned into three parts: head part, interior part, and tail part, according to the order of the frames in the segment. For example, in experiments, the first two frames may be used as the head part and the last two frames may be used as the tail part. In the end, each frame in the trajectory may belong to one of the four categories: head frame, tail frame, interior frame, and buffer frame.

Phase 2—Global Optimization

An entire back-end optimization process may include two stages: global optimization and map update. In this section, the global optimization stage may be described in detail. During the global optimization of the localization and mapping system, it is proposed to leverage the segmentation result and use an efficient and unified segment-based optimization method for both the pose graph optimization and the BA optimization to optimize the frames with large errors, specifically the frames in the head parts and tail parts of the segments in the case of no buffer areas or the frames in both the buffer areas and the head parts and tail parts of the segments in the case of having buffer areas.

The pose graph optimization may be utilized as the global optimization method for the localization and mapping system, especially for the SLAM system. The pose graph optimization mainly uses relative pose transformation of the frames for optimization. For the pose graph optimization, an optimization graph may include pose nodes that represent the poses of the frames in the trajectory in the world coordinate system, and edges between the pose nodes that represent the relative pose transformation between the frames corresponding to the pose nodes.

According to some embodiments of the present disclosure, in the global optimization stage, the segmentation results obtained in the phase of segmentation may be used to reduce the number of pose nodes and edges in the optimization graph so as to reduce the amount of calculation of the optimization. Specifically, all pose nodes in the interior part of each segment and their related edges may be deleted from the optimization graph. But in order to ensure the connectivity of the optimization graph during the global optimization stage, the edges for connecting the pose nodes corresponding to the frames in the head part and the tail part of each segment may be added to approximate the deleted edges.

Figure 4A:
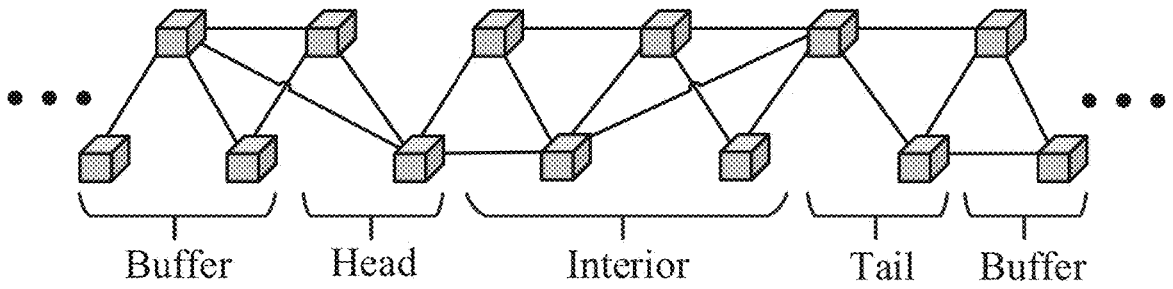
FIG. 4a shows an example traditional optimization graph for pose graph optimization.
Figure 4B:
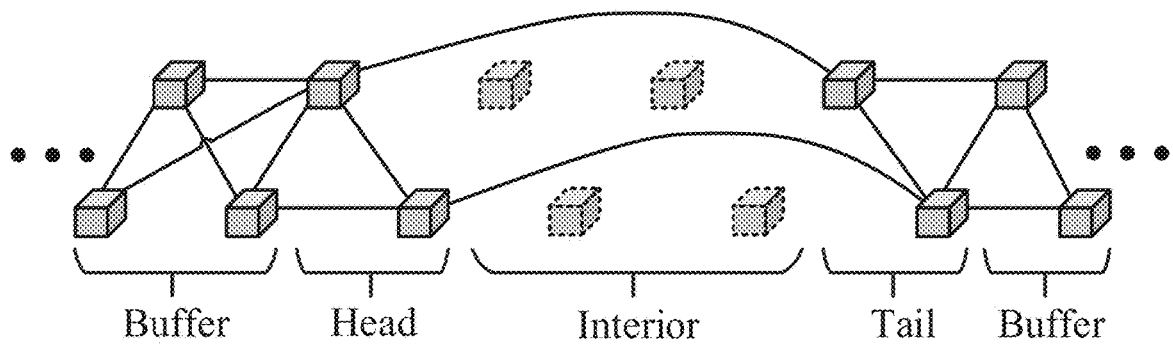
FIG. 4b shows an example of a simplified optimization graph for the pose graph optimization, according to some embodiments of the present application.

For example, FIG. 4a shows an example traditional optimization graph for the pose graph optimization, and FIG. 4b shows an example of a simplified optimization graph for the pose graph optimization according to some embodiments of the present application. As illustrated in FIG. 4a and FIG. 4b, the solid-line squares represent the pose nodes in the optimization graph, the dotted-line squares represent the pose nodes that are deleted from the optimization graph for reducing the amount of calculation of the optimization, and the connection lines between the pose nodes represent the relative pose transformations between the frames in the trajectory and are used as the edges during the optimization.

As the nodes and edges in the optimization graph have changed, an optimization equation also changes. By reducing the number of nodes and edges that participate in the optimization, the speed of optimization may be greatly improved.

After the global optimization, the optimization may enter the stage of map update. According to the simplified global optimization as described above, optimized mapping results for the frames in the head part and the tail part of each segment and the frames in the buffer areas may be obtained. In the stage of map update, an estimation method may be needed to get the optimized mapping results for the frames in the interior part of each segment. According to some embodiments of the present disclosure, it is proposed to fix the frames in the head and tail parts and use an efficient interpolation method instead of optimization to estimate the optimized mapping results for the frames in the interior part of each segment. The interpolation method will be described in detail in the section of Phase 3—Map update. In this way, the optimized mapping result for each frame (i.e. the pose of each frame) in the SLAM system may be obtained and a map built by the SLAM system may be updated according to the optimized mapping results of the frames.

The BA optimization may also be utilized as the global optimization method for the localization and mapping system such as the SLAM system and the SfM system. The BA optimization uses the reprojection errors between landmarks and frames together with the frame poses for optimization. For the BA optimization, an optimization graph may include pose nodes that represent poses of the frames in the trajectory, landmark nodes that represent 3D coordinates of landmarks in each frame of the trajectory, and edges that connect landmark nodes to respective pose nodes and represent estimations of reprojection errors between the landmark nodes and the respective pose nodes.

Similar to the pose graph optimization, the entire optimization process may be also divided into two steps: global pose optimization and map update. In the global optimization stage, the optimization graph may be first simplified. Similar to the pose graph optimization, the pose nodes and the landmark nodes corresponding to the frames in the head part and the tail part of each segment and the frames in the buffer areas, and related edges may be retained in the optimization graph. Besides, in order to ensure the connectivity, a minimum number of interconnected frames are selected from the frames in the interior part of each segment as the connecting frames between the head part and the tail part of the segment, and the landmark nodes, pose nodes and edges other than those associated with the selected connecting frames may be deleted from the optimization graph so as to simplify the optimization graph.

In practice, the last frame in time sequence may be selected from the frames whose covisibilities with the last frame in the head part are greater than 30 and added as one of the connecting frames. Then the same method may be used for the frame just selected to obtain a new connecting frame. The above process may be repeated until the covisibility of the last selected frame with the first frame in the tail part exceeds 30. In this way, the fewest connecting frames may be selected to maintain the connectivity of the frames for the BA optimization. In the end, the pose nodes involved in the global optimization may include the poses nodes corresponding to the frames in the head and tail parts of each segment and the buffer areas and the connecting frames, and the landmark nodes involved in the global optimization may include only the landmark nodes having connected edges with the pose nodes.

Figure 5A:
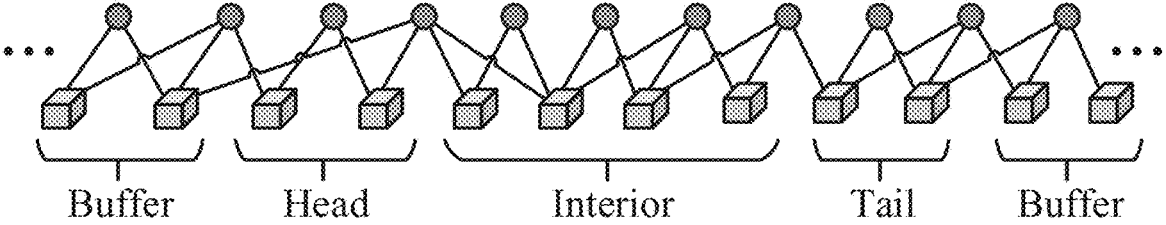
FIG. 5a shows an example traditional optimization graph for bundle adjustment (BA) optimization.
Figure 5B:
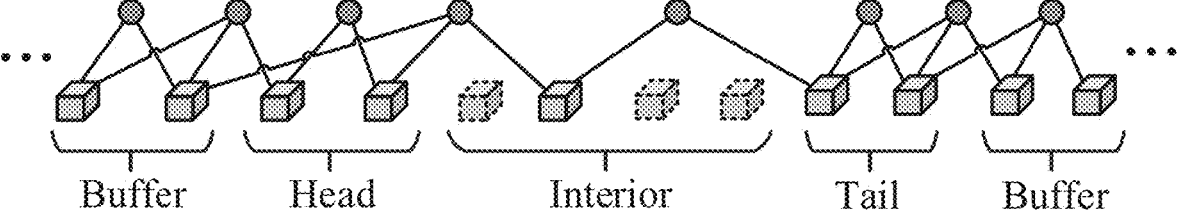
FIG. 5b shows an example of a simplified optimization graph for the BA optimization, according to some embodiments of the present application.

In this way, for example, FIG. 5a shows an example traditional optimization graph for the BA optimization, and FIG. 5b shows an example of a simplified optimization graph for the BA optimization, according to some embodiments of the present application. As illustrated in FIG. 5a and FIG. 5b, the solid-line squares represent the pose nodes in the optimization graph, the dotted-line squares represent the pose nodes that are deleted from the optimization graph for reducing the amount of calculation of the optimization, the gray dots represent the landmark nodes, and the connection lines between the landmark nodes and the respective pose nodes represent estimations of reprojection errors between the landmark nodes and the respective pose nodes and are used as the edges during the optimization.

Similar to the pose graph optimization, after the BA optimization, for each segment, the frames in the head and tail parts of each segment and the connecting frames may be fixed, and an efficient interpolation instead of optimization may be used to estimate the optimized mapping results for other frames in the interior part of each segment. In this way, the optimized mapping result for each frame (i.e. the pose of each frame and the landmark position) in the SLAM system or the SfM system may be obtained, and a map built by the SLAM system or the SfM system may be updated according to the optimized mapping results of the frames.

Phase 3—Map Update

As described above, the entire back-end optimization process may include two stages: global optimization and map update. In this section, the stage of map update will be described in detail. Specifically, an efficient interpolation method for obtaining approximate results for the un-optimized frames based on the optimized frames after the global optimization stage will be described in detail.

When there are accurate pose results obtained by optimization on both sides of a frame to be estimated and an accurate estimation of the pose transformation relationship between the frames, an interpolation may be used instead of the optimization to get approximate optimization results, which can avoid heavy computation. Therefore, it is proposed to use an improved interpolation method instead of the optimization method to efficiently calculate the results.

In the above global optimization stage, the global optimization process is performed based on the frames in the head and tail parts of each segment and more accurate mapping results of these frames are obtained after the optimization. Thus the optimized mapping results of the frames in the head and tail parts of each segment may be taken as reference to estimate the optimized mapping results of the frames in the interior part of the segment. For each frame in the interior part of the segment that does not participate in the global optimization, the transformation relationships between a current frame and reference frames may be used to accomplish the interpolation.

According to some embodiments of the present disclosure, a relative velocity may be taken as an interpolation factor, then relative pose transformations between the frames in each segment may be used to calculate a rotation matrix and a translation vector of a current frame relative to reference frames in the head and tail parts of the segment, and finally a quaternion spherical interpolation may be used to obtain an interpolation result of the rotation matrix of the current frame and a linear interpolation may be used to obtain an interpolation result of the translation vector of the current frame.

FIG. 6 illustrates an example interpolation process for estimating optimized mapping results of frames in an interior part of a segment of a trajectory tracked by the localization and mapping system, according to some embodiments of the present disclosure. As shown in the upper part of FIG. 6, $F_H$ represents a reference frame in the head part of the segment, $F_T$ represents a reference frame in the tail part of the segment, $F_C$ represents a current frame in the interior part of the segment, $T_{CH}$ represents a relative pose transformation between $F_C$ and $F_H$ that is a combination of a rotation matrix $R_{CH}$ and a translation vector $t_{CH}$ between $F_C$ and $F_H$, $T_{CT}$ represents a relative pose transformation between $F_C$ and $F_T$ that is a combination of a rotation matrix $R_{CT}$ and a translation vector $t_{CT}$ between $F_C$ and $F_T$. As shown in the lower part of FIG. 6, $F_H$* represents the reference frame in the head part of the segment that has an optimized pose obtained by the global optimization, $F_T$* represents the reference frame in the tail part of the segment that has an optimized pose obtained by the global optimization, $F_{C1}$ represents a first intermediate frame having a pose derived from the optimized pose of $F_H$* and the relative pose transformation $T_{CH}$, $F_{C2}$ represents a second intermediate frame having a pose derived from the optimized pose of $F_T$* and the relative pose transformation $T_{CT}$, and $F_C$* represents the current frame in the interior part of the segment that has a pose obtained by the quaternion spherical interpolation and the linear interpolation between $F_{C1}$ and $F_{C2}$. Therefore, the optimized mapping result (e.g. the pose and/or the landmark coordinates) of $F_C$* can be estimated based on the optimized mapping results of $F_H$* and $F_T$*.

Likewise, based on the optimized mapping results of $F_H$* and $F_C$*, an optimized mapping result of a frame between $F_H$* and $F_C$* can be estimated in a similar way, and based on the optimized mapping results of $F_C$* and $F_T$*, an optimized mapping result of a frame between $F_C$* and $F_T$* can be estimated in a similar way. In this way, the optimized mapping results for all of the frames in the interior part of the segment can be estimated by performing the interpolation iteratively based on the optimized mapping results for the frames in the head part and the tail part of the segment.

The mathematical form of the interpolation algorithm may be shown by Equation (3) as follows:

$$R^*_{HC} = R_{HC}□SLERP(\delta(R), \alpha) \qquad (3)$$

$$t^*_{HC} = t_{HC} + LERP(R^*_{HC}□\delta(t), \alpha)$$

$$s_C = \frac{1}{\alpha + 1}s_H + \frac{\alpha}{\alpha + 1}s_T$$

where $$\delta(R) = R^T_{HC}□R^*_{HT}□R_{TC}$$

$$\delta(t) = t_{HC} + R^*_{CH}t_{HT} + R^*_{CT}t_{TC}$$

$$\alpha = \frac{\sqrt{\sum_{F_i \in \varphi(l)}\|\vec{v}(F_i)\|^2}}{\sqrt{\sum_{F_i \in \varphi(r)}\|\vec{v}(F_i)\|^2}},$$

where R represents a rotation matrix between two frames, t represents a translation vector between two frames, $R_{HC}$* represents the rotation matrix between $F_H$* and $F_C$*, $R_{HC}$ represents the rotation matrix between $F_H$ and $F_C$, $t_{HC}$* represents the translation vector between $F_H$* and $F_C$*, $t_{HC}$ represents the translation vector between $F_H$ and $F_C$, sc represents a scale of $F_C$, $s_H$ represents a scale of $F_H$, $s_T$ represents a scale of $F_T$, $R_{HC}^T$ represents a transposition of $R_{HC}$, $R_{HT}$* represents the rotation matrix between $F_H$* and $F_T$*, $R_TC$ represents the rotation matrix between $F_T$ and $F_C$, $R_{CH}$* represents the rotation matrix between $F_C$* and $F_H$*, $t_{HT}$ represents the translation vector between $F_H$ and $F_T$, $R_{CT}$* represents the rotation matrix between $F_C$* and $F_T$*, $t_Tc$ represents the translation vector between $F_T$ and $F_C$, $\varphi(l)$ represents a set of frames between $F_H$ and $F_C$, $\varphi(r)$ represents a set of frames between $F_C$ and $F_T$,

10

$$\vec{v}(F_i)$$

represents a pose transformation velocity vector of an ith frame $F_i$, SLERP represents a function of quaternion spherical interpolation, and LERP represents a function of linear interpolation. It is noted that in addition to the rotation matrix and the translation vector between two frames, the scales of the frames are also considered for estimating the optimized mapping results of the frames.

For the BA optimization, the connecting frames along with the frames in the head and tail parts of the segment may all participate in the global optimization. Therefore, for the BA optimization, the reference frames for the interpolation may also include the connecting frames in addition to the frames in the head and tail parts of the segment. In addition, after completing the interpolation to obtain the poses of the frames in a similar way as the pose graph optimization, the landmarks associated with the frames not involved in the BA optimization will be updated according to their positional relationships with the reference frames.

Due to the high accuracy of estimation from global optimization, the use of interpolation instead of optimization can obtain results in a small loss of accuracy but can save a lot of time. At the same time, compared with the method of directly not optimizing the errors within segments, interpolation can effectively eliminate the errors. Therefore, the proposed map optimization method can strike a better balance between efficiency and accuracy.

Regarding the benefits of the proposed map optimization method, experiments for different optimization algorithms have been conducted to illustrate the efficiency and accuracy of the method. The map optimization method is applied to public SLAM datasets including KITTI dataset for autonomous driving, TUM RGB-D dataset for robotics and EuRoC dataset for drones. The map optimization method is implemented based on OpenVSLAM, an open-source SLAM system. Compared with traditional optimization methods of OpenVSLAM, the proposed map optimization method has almost no loss in terms of accuracy, but has a greatly improved efficiency, as shown in Table 1.

TABLE 1

| | | results of Base Line Experiment | | | | | |
|---|---|---|---|---|---|---|---|
| | | OpenVSLAM [8] | | | Our method | | |
| | | PG | BA | RMSE | PG | BA | RMSE |
| KITTI 00 | Loop-1 | 2.01 | 4.68 | 1.32 | 0.50 | 1.49 | 1.33 |
| | Loop-2 | 3.38 | 7.77 | | 0.68 | 2.69 | |
| | Loop-3 | 4.24 | 9.67 | | 0.97 | 3.12 | |
| | Loop-4 | 5.48 | 12.7 | | 1.48 | 3.77 | |
| KITTI 02 | Loop-1 | 4.67 | 12.8 | 5.71 | 1.67 | 3.87 | 5.72 |
| | Loop-2 | 4.72 | 13.6 | | 1.87 | 3.92 | |
| KITTI 05 | Loop-1 | 1.86 | 5.18 | 0.83 | 0.23 | 0.78 | 0.85 |
| | Loop-2 | 3.79 | 8.67 | | 0.53 | 1.77 | |
| | Loop-3 | 3.88 | 8.98 | | 0.53 | 1.87 | |
| KITTI 06 | Loop-1 | 1.30 | 5.04 | 0.83 | 0.23 | 0.75 | 0.82 |
| KITTI 07 | Loop-1 | 1.89 | 2.66 | 0.49 | 0.18 | 0.82 | 0.52 |
| KITTI 09 | Loop-1 | 1.96 | 4.42 | 1.97 | 0.43 | 1.42 | 2.04 |
| EuRoC MH-05 | Loop-1 | 1.25 | 3.48 | 5.76 | 0.26 | 0.46 | 5.83 |
| EuRoC V1-02 | Loop-1 | 0.17 | 0.56 | 6.46 | 0.11 | 0.56 | 6.52 |

TABLE 1-continued

| | | OpenVSLAM [8] | | | Our method | | |
|---|---|---|---|---|---|---|---|
| | | PG | BA | RMSE | PG | BA | RMSE |
| EuRoc V1-03 | Loop-1 | 0.05 | 0.19 | 6.42 | 0.03 | 0.11 | 6.50 |
| TUM loop | Loop-1 | 4.01 | 13.1 | 9.62 | 1.69 | 2.41 | 9.71 |
| TUM pioneer | Loop-1 | 1.64 | 3.05 | 6.74 | 0.42 | 2.57 | 6.87 |
| | Avg change rate | +0% | +0% | +0% | −72.2% | −65.0% | +1.60% | results of Base Line Experiment

The inventors selected sequences with loops in three SLAM datasets for the experiment, recorded the time of pose graph optimization and BA optimization during each loop to evaluate the efficiency, and recorded the final Root Mean Square Error (RMSE) of each sequence to evaluate the accuracy. As shown in Table 1, PG means the time of pose graph optimization in each loop and BA means the time of BA optimization, the unit of PG and BA is second(s), and the unit of RMSE is meter (m) in KITTI sequences and centimeter (cm) in TUM and EuRoC sequences.

Besides, the proposed map optimization method is also compared with other high-efficiency methods on the KITTI dataset, and the result shows that the proposed map optimization method significantly outperforms existing methods in terms of efficiency and accuracy, as shown in Table 2.

TABLE 2 results of High Efficiency Optimization Experiment

| KITTI | ORB SLAM2 [9] | ENFT SFM [1] | Hybyrid BA(ORB) [3] | Hybyrid BA(DL) [3] | Our Method |
|---|---|---|---|---|---|
| 00 | 1.43/11.7 | 4.80/8.25 | 4.90/3.42 | 2.80/8.39 | 1.33/4.16 |
| 02 | 5.72/19.6 | 28.3/14.7 | 18.2/4.43 | 15.9/13.2 | 5.72/3.94 |
| 03 | 0.71/2.57 | 2.90/1.79 | 1.50/0.78 | 1.20/1.44 | 0.67/0.30 |
| 04 | 0.20/0.97 | 0.70/0.87 | 0.90/0.14 | 0.30/0.59 | 0.21/0.21 |
| 05 | 0.82/8.77 | 3.50/6.18 | 2.90/4.87 | 3.20/6.23 | 0.85/2.60 |
| 06 | 0.83/4.60 | 14.4/2.53 | 8.20/0.65 | 9.20/3.75 | 0.82/1.15 |
| 07 | 0.57/2.69 | 2.00/0.67 | 2.20/0.70 | 2.20/1.54 | 0.52/0.65 |
| 08 | 3.65/22.9 | 28.3/11.5 | 33.6/10.1 | 21.9/21.4 | 3.68/3.26 |
| 09 | 1.98/4.65 | 5.90/2.04 | 6.50/1.96 | 6.20/5.57 | 2.04/1.34 |
| 10 | 1.04/3.15 | 18.5/2.62 | 7.60/0.69 | 6.00/2.12 | 1.19/0.67 |
| ACR | +0%/+0% | +595%/−36.8% | +403%/−70.0% | +317%/−25.4% | +0.40%/−76.8% |

The results shown in Table 2 are the RMSE and the time of optimization and the units are respectively meter (m) and second(s). In order to ensure fairness, the final global BA optimization time after the completion of tracking is recorded to evaluate the efficiency. In addition, Absolute Trajectory Error (ATE) of the final optimization result is used to evaluate the accuracy, and ACR means an average change rate compared with the first column.

For better understanding of the overall idea of the map optimization method for the localization and mapping system as proposed in the present application, the map optimization method will be further described with reference to the flow chart shown in FIG. 7.

FIG. 7 shows an example flow chart of a map optimization method 700 for the localization and mapping system, according to some embodiments of the present disclosure. As shown in FIG. 7, the method 700 may include operations 710 to 740 that may be implemented by a map optimization apparatus including a processor circuitry.

At operation 710, the processor circuitry may segment, based on a preset segmentation condition, a trajectory tracked by the localization and mapping system to obtain a plurality of segments of the trajectory. Each of the plurality of segments may be partitioned into a head part, an interior part and a tail part.

According to some embodiments, the present segmentation condition may be given by the above described Equation (1). When the preset segmentation condition is satisfied, the segment preceding the current frame may be extended to include the current frame, otherwise, the segment preceding the current frame may end and a new segment may be created by including the current frame as a first frame of the new segment.

At operation 720, the processor circuitry may perform a global optimization process based on frames in the head part and the tail part of each segment of the trajectory to obtain optimized mapping results for the frames in the head part and the tail part of each segment of the trajectory.

According to some embodiments, the global optimization process may be a pose graph optimization process based on an optimization graph including pose nodes that represent poses of the frames in the trajectory and edges that represent relative pose transformations between the pose nodes. The optimization graph may be simplified by: deleting all pose nodes corresponding to the frames in the interior part of each segment of the trajectory and edges associated with the deleted nodes, and adding edges by connecting pose nodes corresponding to the frames in the head part and the tail part of each segment of the trajectory. The optimized mapping results for the frames in each segment of the trajectory may include optimized poses of the frames in the segment.

According to some embodiments, the global optimization process may be a BA optimization process based on an optimization graph including pose nodes that represent poses of the frames in the trajectory, landmark nodes that represent 3D coordinates of landmarks in the trajectory, and edges that connect landmark nodes to respective pose nodes and represent estimations of reprojection errors between the landmark nodes and the respective pose nodes. The optimization graph may be simplified by: selecting, under the premise of ensuring connectivity of the optimization graph, a minimum number of interconnected frames from the frames in the interior part of each segment as one or more connecting frames between the head part and the tail part of each segment, and deleting, from the interior part of each segment, landmark nodes, pose nodes and edges other than those associated with the connecting frames. The optimized mapping results for the frames in each segment of the trajectory may include optimized poses of the frames and optimized landmark coordinates in the frames.

At operation 730, the processor circuitry may estimate optimized mapping results for frames in the interior part of each segment of the trajectory based on the optimized mapping results for the frames in the head part and the tail part of the segment.

At operation 740, the processor circuitry may update a map built by the localization and mapping system according to the optimized mapping results for the frames in each segment of the trajectory.

According to some embodiments, the processor circuitry may further determine a buffer area between adjacent segments of the plurality of segments based on a preset buffer condition; perform the global optimization process based on the frames in the head part and the tail part of each segment of the trajectory and frames in buffer areas of the trajectory to obtain the optimized mapping results for the frames in the head part and the tail part of each segment of the trajectory and optimized mapping results for the frames in the buffer areas of the trajectory; and update the map with the optimized mapping results for the frames in each segment of the trajectory and the optimized mapping results for the frames in the buffer areas of the trajectory.

In these embodiments, when the preset segmentation condition is satisfied, the segment preceding the current frame may be extended to include the current frame, otherwise, the segment preceding the current frame may end and the current frame is categorized as a frame of the buffer area or a new segment based on the preset buffer condition. The preset buffer condition may be given by the above described Equation (2). When the preset segmentation condition is not satisfied but the preset buffer condition is satisfied, the current frame is categorized as a frame of the buffer area, and when neither the preset segmentation condition nor the preset buffer condition is satisfied, the current frame is categorized as a frame of the new segment.

According to some embodiments, the processor circuitry may estimate the optimized mapping results for the frames in the interior part of each segment of the trajectory by: performing, based on the optimized mapping results for the frames in the head part and the tail part of the segment, a quaternion spherical interpolation and a linear interpolation iteratively to obtain the optimized mapping results for the frames in the interior part of the segment.

According to some embodiments, the processor circuitry may estimate the optimized mapping results for the frames in the interior part of each segment of the trajectory by: performing, based on the optimized mapping results for the frames in the head part and the tail part of the segment and the connecting frames, a quaternion spherical interpolation and a linear interpolation iteratively to obtain the optimized mapping results for the frames in the interior part of the segment.

According to some embodiments, the localization and mapping system is a SLAM system or a SfM system.

Figure 8:
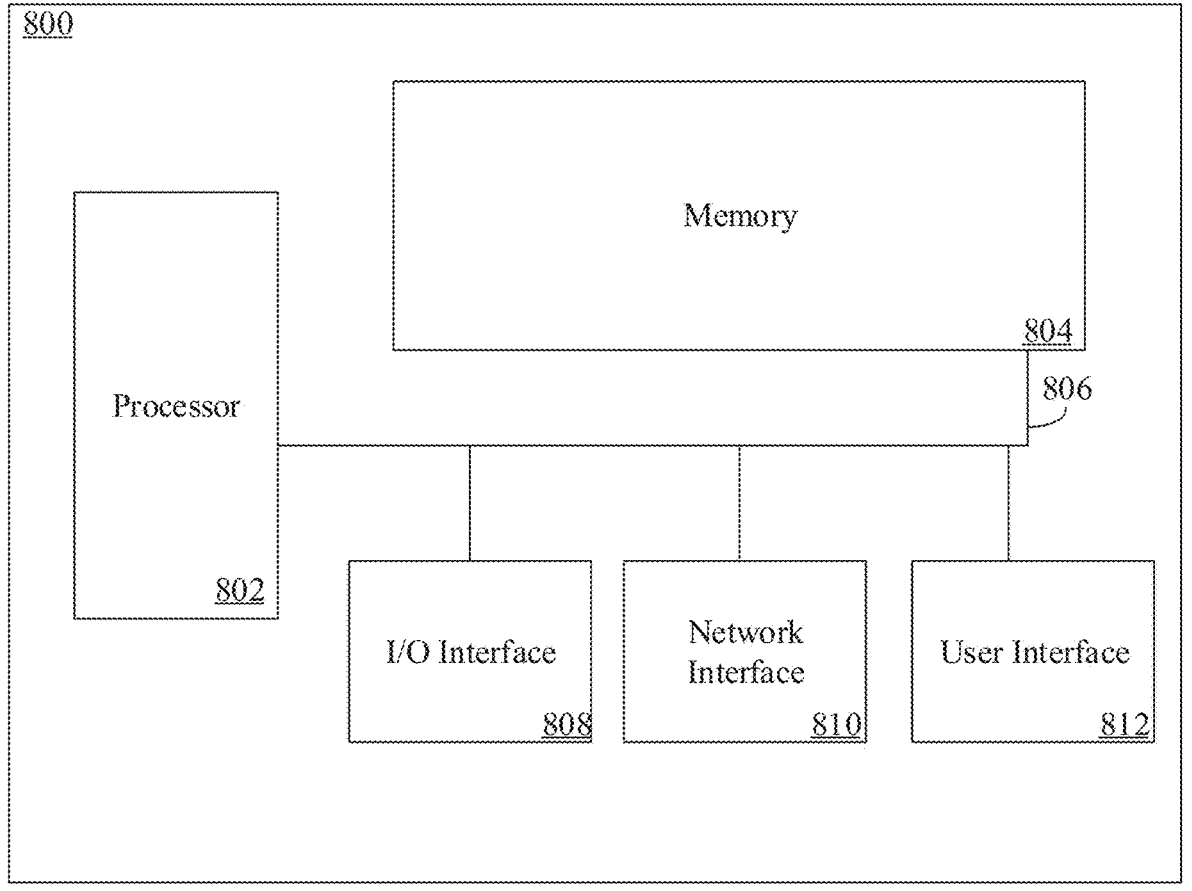
FIG. 8 shows a block diagram of an example computing system that can implement a map optimization method for the localization and mapping system according to some embodiments of the present disclosure.

FIG. 8 illustrates an exemplary computing system 800 that can implement a map optimization method for the localization and mapping system according to some embodiments of the present disclosure. The computing system 800 may include a processor 802 in communication with a memory 804. The memory 804 can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The computing system 800 may additionally include a local communication interface 806 for connectivity between the various components of the system. For example, the local communication interface 806 may be a local data bus and/or any related address or control busses as may be desired.

The computing system or device 800 may also include an I/O (input/output) interface 808 for controlling the I/O functions of the system, as well as for I/O connectivity to devices outside of the computing system 800. A network interface 810 may also be included for network connectivity. The network interface 810 may control network communications both within the system and outside of the system. The network interface may include a wired interface, a wireless interface, a Bluetooth interface, optical interface, and the like, including appropriate combinations thereof. Furthermore, the computing system 800 may additionally include a user interface 812 as well as various other components that would be beneficial for such a system.

The processor 802 may be a single processor or multiple processors, and the memory 804 may be a single memory or multiple memories. The local communication interface 806 may be used as a pathway to facilitate communication between any of a single processor, multiple processors, a single memory, multiple memories, the various interfaces, and the like, in any useful combination.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium, wherein, when the program code is loaded into and executed by a machine, such as a computer, the machine becomes an apparatus for practicing the various techniques. The non-transitory computer readable storage medium may be a computer readable storage medium that does not include signal. In the case of program code execution on programmable computers, the computing system may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Exemplary systems or devices may include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

Additional Notes and Examples

Example 1 includes a map optimization apparatus for a localization and mapping system, comprising interface circuitry; processor circuitry coupled to the interface circuitry and configured to: segment, based on a preset segmentation condition, a trajectory retrieved via the interface circuitry from the localization and mapping system, to obtain a plurality of segments of the trajectory, each of the plurality of segments being partitioned into a head part, an interior part and a tail part; perform a global optimization process based on frames in the head part and the tail part of each segment of the trajectory to obtain optimized mapping results for the frames in the head part and the tail part of each segment of the trajectory; estimate optimized mapping results for frames in the interior part of each segment of the trajectory based on the optimized mapping results for the frames in the head part and the tail part of the segment; and update a map built by the localization and mapping system according to the optimized mapping results for the frames in each segment of the trajectory.

Example 2 includes the map optimization apparatus of Example 1, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and wherein when the preset segmentation condition is satisfied, the segment preceding the current frame is extended to include the current frame, otherwise, the segment preceding the current frame ends and a new segment is created by including the current frame as a first frame of the new segment.

Example 3 includes the map optimization apparatus of Example 1, wherein the processor circuitry is further configured to: determine a buffer area between adjacent segments of the plurality of segments based on a preset buffer condition; perform the global optimization process based on the frames in the head part and the tail part of each segment of the trajectory and frames in buffer areas of the trajectory to obtain the optimized mapping results for the frames in the head part and the tail part of each segment of the trajectory and optimized mapping results for the frames in the buffer areas of the trajectory; and update the map with the optimized mapping results for the frames in each segment of the trajectory and the optimized mapping results for the frames in the buffer areas of the trajectory.

Example 4 includes the map optimization apparatus of Example 3, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and wherein when the preset segmentation condition is satisfied, the segment preceding the current frame is extended to include the current frame, otherwise, the segment preceding the current frame ends and the current frame is categorized as a frame of the buffer area or a new segment based on the preset buffer condition.

Example 5 includes the map optimization apparatus of Example 4, wherein the preset buffer condition comprises a weighted stability of the pose transformation velocity and the reprojection error of the current frame is greater than or equal to a stability threshold, and wherein when the preset segmentation condition is not satisfied but the preset buffer condition is satisfied, the current frame is categorized as a frame of the buffer area, and when neither the preset segmentation condition nor the preset buffer condition is satisfied, the current frame is categorized as a frame of the new segment.

Example 6 includes the map optimization apparatus of any of Examples 1 to 5, wherein the global optimization process is a pose graph optimization process based on an optimization graph comprising pose nodes that represent poses of the frames in the trajectory and edges that represent relative pose transformations between the pose nodes.

Example 7 includes the map optimization apparatus of Example 6, wherein the optimization graph is simplified by: deleting all pose nodes corresponding to the frames in the interior part of each segment of the trajectory and edges associated with the deleted nodes, and adding edges by connecting pose nodes corresponding to the frames in the head part and the tail part of each segment of the trajectory.

Example 8 includes the map optimization apparatus of Example 6, wherein the optimized mapping results for the frames in each segment of the trajectory comprise optimized poses of the frames in the segment.

Example 9 includes the map optimization apparatus of any of Examples 1 to 5, wherein the global optimization process is a bundle adjustment (BA) optimization process based on an optimization graph comprising pose nodes that represent poses of the frames in the trajectory, landmark nodes that represent three dimensional (3D) coordinates of landmarks in the trajectory, and edges that connect landmark nodes to respective pose nodes and represent estimations of reprojection errors between the landmark nodes and the respective pose nodes.

Example 10 includes the map optimization apparatus of Example 9, wherein the optimization graph is simplified by: selecting, under the premise of ensuring connectivity of the optimization graph, a minimum number of interconnected frames from the frames in the interior part of each segment as one or more connecting frames between the head part and the tail part of each segment, and deleting, from the interior part of each segment, landmark nodes, pose nodes and edges other than those associated with the connecting frames.

Example 11 includes the map optimization apparatus of Example 9, wherein the optimized mapping results for the frames in each segment of the trajectory comprise optimized poses of the frames and optimized landmark coordinates in the frames.

Example 12 includes the map optimization apparatus of any of Examples 1 to 11, wherein the processor circuitry is configured to estimate the optimized mapping results for the frames in the interior part of each segment of the trajectory by: performing, based on the optimized mapping results for the frames in the head part and the tail part of the segment, a quaternion spherical interpolation and a linear interpolation iteratively to obtain the optimized mapping results for the frames in the interior part of the segment.

Example 13 includes the map optimization apparatus of Example 10, wherein the processor circuitry is configured to estimate the optimized mapping results for the frames in the interior part of each segment of the trajectory by: performing, based on the optimized mapping results for the frames in the head part and the tail part of the segment and the connecting frames, a quaternion spherical interpolation and a linear interpolation iteratively to obtain the optimized mapping results for the frames in the interior part of the segment.

Example 14 includes the map optimization apparatus of Example 1, wherein the localization and mapping system is a Simultaneous Localization and Mapping (SLAM) system or a Structure from Motion (SfM) system.

Example 15 includes a map optimization method for a localization and mapping system, comprising: segmenting, based on a preset segmentation condition, a trajectory tracked by the localization and mapping system to obtain a plurality of segments of the trajectory, each of the plurality of segments being partitioned into a head part, an interior part and a tail part; performing a global optimization process based on frames in the head part and the tail part of each segment of the trajectory to obtain optimized mapping results for the frames in the head part and the tail part of each segment of the trajectory; estimating optimized mapping results for frames in the interior part of each segment of the trajectory based on the optimized mapping results for the frames in the head part and the tail part of the segment; and updating a map built by the localization and mapping system according to the optimized mapping results for the frames in each segment of the trajectory.

Example 16 includes the map optimization method of Example 15, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and wherein when the preset segmentation condition is satisfied, the segment preceding the current frame is extended to include the current frame, otherwise, the segment preceding the current frame ends and a new segment is created by including the current frame as a first frame of the new segment.

Example 17 includes the map optimization method of Example 15, comprising: determining a buffer area between adjacent segments of the plurality of segments based on a preset buffer condition; performing the global optimization process based on the frames in the head part and the tail part of each segment of the trajectory and frames in buffer areas of the trajectory to obtain the optimized mapping results for the frames in the head part and the tail part of each segment of the trajectory and optimized mapping results for the frames in the buffer areas of the trajectory; and updating the map with the optimized mapping results for the frames in each segment of the trajectory and the optimized mapping results for the frames in the buffer areas of the trajectory.

Example 18 includes the map optimization method of Example 17, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and wherein when the preset segmentation condition is satisfied, the segment preceding the current frame is extended to include the current frame, otherwise, the segment preceding the current frame ends and the current frame is categorized as a frame of the buffer area or a new segment based on the preset buffer condition.

Example 19 includes the map optimization method of Example 18, wherein the preset buffer condition comprises a weighted stability of the pose transformation velocity and the reprojection error of the current frame is greater than or equal to a stability threshold, and wherein when the preset segmentation condition is not satisfied but the preset buffer condition is satisfied, the current frame is categorized as a frame of the buffer area, and when neither the preset segmentation condition nor the preset buffer condition is satisfied, the current frame is categorized as a frame of the new segment.

Example 20 includes the map optimization method of any of Examples 15 to 19, wherein the global optimization process is a pose graph optimization process based on an optimization graph comprising pose nodes that represent poses of the frames in the trajectory and edges that represent relative pose transformations between the pose nodes.

Example 21 includes the map optimization method of Example 20, wherein the optimization graph is simplified by: deleting all pose nodes corresponding to the frames in the interior part of each segment of the trajectory and edges associated with the deleted nodes, and adding edges by connecting pose nodes corresponding to the frames in the head part and the tail part of each segment of the trajectory.

Example 22 includes the map optimization method of Example 20, wherein the optimized mapping results for the frames in each segment of the trajectory comprise optimized poses of the frames in the segment.

Example 23 includes the map optimization method of any of Examples 15 to 19, wherein the global optimization process is a bundle adjustment (BA) optimization process based on an optimization graph comprising pose nodes that represent poses of the frames in the trajectory, landmark nodes that represent three dimensional (3D) coordinates of landmarks in the trajectory, and edges that connect landmark nodes to respective pose nodes and represent estimations of reprojection errors between the landmark nodes and the respective pose nodes.

Example 24 includes the map optimization method of Example 23, wherein the optimization graph is simplified by: selecting, under the premise of ensuring connectivity of the optimization graph, a minimum number of interconnected frames from the frames in the interior part of each segment as one or more connecting frames between the head part and the tail part of each segment, and deleting, from the interior part of each segment, landmark nodes, pose nodes and edges other than those associated with the connecting frames.

Example 25 includes the map optimization method of Example 23, wherein the optimized mapping results for the frames in each segment of the trajectory comprise optimized poses of the frames and optimized landmark coordinates in the frames.

Example 26 includes the map optimization method of any of Examples 15 to 25, wherein the estimating optimized mapping results for frames in the interior part of each segment of the trajectory comprises: performing, based on the optimized mapping results for the frames in the head part and the tail part of the segment, a quaternion spherical interpolation and a linear interpolation iteratively to obtain the optimized mapping results for the frames in the interior part of the segment.

Example 27 includes the map optimization method of Example 24, wherein the estimating optimized mapping results for frames in the interior part of each segment of the trajectory comprises: performing, based on the optimized mapping results for the frames in the head part and the tail part of the segment and the connecting frames, a quaternion spherical interpolation and a linear interpolation iteratively to obtain the optimized mapping results for the frames in the interior part of the segment.

Example 28 includes the map optimization method of Example 15, wherein the localization and mapping system is a Simultaneous Localization and Mapping (SLAM) system or a Structure from Motion (SfM) system.

Example 29 includes a computer-readable medium having instructions stored thereon, wherein the instructions, when executed by processor circuitry, cause the processor circuitry to perform the map optimization method of any of Examples 15 to 28.

Example 30 includes a map optimization apparatus for a localization and mapping system, comprising means for performing the map optimization method of any of Examples 15 to 28.

Example 31 includes a localization and mapping system comprising the map optimization apparatus of any of Examples 1 to 14.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A map optimization apparatus for a localization and mapping system, comprising interface circuitry; processor circuitry coupled to the interface circuitry and configured to:
   segment, based on a preset segmentation condition, a trajectory retrieved via the interface circuitry from the localization and mapping system, to obtain a plurality of segments of the trajectory, each of the plurality of segments being partitioned into a head part, an interior part and a tail part;
   perform a global optimization process based on frames in the head part and the tail part of each segment of the trajectory to obtain optimized mapping results for the frames in the head part and the tail part of each segment of the trajectory;
   estimate optimized mapping results for frames in the interior part of each segment of the trajectory based on the optimized mapping results for the frames in the head part and the tail part of the segment; and
   update a map built by the localization and mapping system according to the optimized mapping results for the frames in each segment of the trajectory.

2. The map optimization apparatus of claim 1, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and
   wherein when the preset segmentation condition is satisfied, the segment preceding the current frame is extended to include the current frame, otherwise, the segment preceding the current frame ends and a new segment is created by including the current frame as a first frame of the new segment.

3. The map optimization apparatus of claim 1, wherein the processor circuitry is further configured to:
   determine a buffer area between adjacent segments of the plurality of segments based on a preset buffer condition;
   perform the global optimization process based on the frames in the head part and the tail part of each segment of the trajectory and frames in buffer areas of the trajectory to obtain the optimized mapping results for the frames in the head part and the tail part of each segment of the trajectory and optimized mapping results for the frames in the buffer areas of the trajectory; and
   update the map with the optimized mapping results for the frames in each segment of the trajectory and the optimized mapping results for the frames in the buffer areas of the trajectory.

4. The map optimization apparatus of claim 3, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and wherein when the preset segmentation condition is satisfied, the segment preceding the current frame is extended to include the current frame, otherwise, the segment preceding the current frame ends and the current frame is categorized as a frame of the buffer area or a new segment based on the preset buffer condition.

5. The map optimization apparatus of claim 1, wherein the global optimization process is a pose graph optimization process based on an optimization graph comprising pose nodes that represent poses of the frames in the trajectory and edges that represent relative pose transformations between the pose nodes.

6. The map optimization apparatus of claim 5, wherein the optimization graph is simplified by: deleting all pose nodes corresponding to the frames in the interior part of each segment of the trajectory and edges associated with the deleted nodes, and adding edges by connecting pose nodes corresponding to the frames in the head part and the tail part of each segment of the trajectory.

7. The map optimization apparatus of claim 5, wherein the optimized mapping results for the frames in each segment of the trajectory comprise optimized poses of the frames in the segment.

8. The map optimization apparatus of claim 1, wherein the global optimization process is a bundle adjustment (BA) optimization process based on an optimization graph comprising pose nodes that represent poses of the frames in the trajectory, landmark nodes that represent three dimensional (3D) coordinates of landmarks in the trajectory, and edges that connect landmark nodes to respective pose nodes and represent estimations of reprojection errors between the landmark nodes and the respective pose nodes.

9. The map optimization apparatus of claim 8, wherein the optimization graph is simplified by: selecting, under the premise of ensuring connectivity of the optimization graph, a minimum number of interconnected frames from the frames in the interior part of each segment as one or more connecting frames between the head part and the tail part of each segment, and deleting, from the interior part of each segment, landmark nodes, pose nodes and edges other than those associated with the connecting frames.

10. The map optimization apparatus of claim 1, wherein the processor circuitry is configured to estimate the optimized mapping results for the frames in the interior part of each segment of the trajectory by:
   performing, based on the optimized mapping results for the frames in the head part and the tail part of the segment, a quaternion spherical interpolation and a linear interpolation iteratively to obtain the optimized mapping results for the frames in the interior part of the segment.

11. The map optimization apparatus of claim 9, wherein the processor circuitry is configured to estimate the optimized mapping results for the frames in the interior part of each segment of the trajectory by:
   performing, based on the optimized mapping results for the frames in the head part and the tail part of the segment and the connecting frames, a quaternion spherical interpolation and a linear interpolation iteratively to obtain the optimized mapping results for the frames in the interior part of the segment.

12. The map optimization apparatus of claim 1, wherein the localization and mapping system is a Simultaneous Localization and Mapping (SLAM) system or a Structure from Motion (SfM) system.

13. A map optimization method for a localization and mapping system, comprising:
   segmenting, based on a preset segmentation condition, a trajectory tracked by the localization and mapping system to obtain a plurality of segments of the trajectory, each of the plurality of segments being partitioned into a head part, an interior part and a tail part;
   performing a global optimization process based on frames in the head part and the tail part of each segment of the trajectory to obtain optimized mapping results for the frames in the head part and the tail part of each segment of the trajectory;
   estimating optimized mapping results for frames in the interior part of each segment of the trajectory based on the optimized mapping results for the frames in the head part and the tail part of the segment; and
   updating a map built by the localization and mapping system according to the optimized mapping results for the frames in each segment of the trajectory.

14. The map optimization method of claim 13, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and
   wherein when the preset segmentation condition is satisfied, the segment preceding the current frame is extended to include the current frame, otherwise, the segment preceding the current frame ends and a new segment is created by including the current frame as a first frame of the new segment.

15. The map optimization method of claim 13, comprising:
   determining a buffer area between adjacent segments of the plurality of segments based on a preset buffer condition;
   performing the global optimization process based on the frames in the head part and the tail part of each segment of the trajectory and frames in buffer areas of the trajectory to obtain the optimized mapping results for the frames in the head part and the tail part of each segment of the trajectory and optimized mapping results for the frames in the buffer areas of the trajectory; and
   updating the map with the optimized mapping results for the frames in each segment of the trajectory and the optimized mapping results for the frames in the buffer areas of the trajectory.

16. The map optimization method of claim 15, wherein the preset segmentation condition comprises: a modulus of a difference between a pose transformation velocity vector of a current frame in the trajectory and an average of pose transformation velocity vectors of frames in a segment preceding the current frame is less than a pose transformation velocity threshold, and a reprojection error of the current frame is less than a reprojection error threshold, and
   wherein when the preset segmentation condition is satisfied, the segment preceding the current frame is extended to include the current frame, otherwise, the segment preceding the current frame ends and the current frame is categorized as a frame of the buffer area or a new segment based on the preset buffer condition.

17. The map optimization method of claim 13, wherein the global optimization process is a pose graph optimization process based on an optimization graph comprising pose nodes that represent poses of the frames in the trajectory and edges that represent relative pose transformations between the pose nodes.

18. The map optimization method of claim 17, wherein the optimization graph is simplified by: deleting all pose nodes corresponding to the frames in the interior part of each segment of the trajectory and edges associated with the deleted nodes, and adding edges by connecting pose nodes corresponding to the frames in the head part and the tail part of each segment of the trajectory.

19. The map optimization method of claim 13, wherein the global optimization process is a bundle adjustment (BA) optimization process based on an optimization graph comprising pose nodes that represent poses of the frames in the trajectory, landmark nodes that represent three dimensional (3D) coordinates of landmarks in the trajectory, and edges that connect landmark nodes to respective pose nodes and represent estimations of reprojection errors between the landmark nodes and the respective pose nodes.

20. A non-transitory computer-readable medium comprising instructions stored thereon, wherein the instructions cause the processor circuitry to:

segment, based on a preset segmentation condition, a trajectory tracked by the localization and mapping system to obtain a plurality of segments of the trajectory, each of the plurality of segments being partitioned into a head part, an interior part and a tail part;

perform a global optimization process based on frames in the head part and the tail part of each segment of the trajectory to obtain optimized mapping results for the frames in the head part and the tail part of each segment of the trajectory;

estimate optimized mapping results for frames in the interior part of each segment of the trajectory based on the optimized mapping results for the frames in the head part and the tail part of the segment; and update a map built by the localization and mapping system according to the optimized mapping results for the frames in each segment of the trajectory.

* * * * *